(12) United States Patent
Baumann et al.

(10) Patent No.: US 6,474,284 B1
(45) Date of Patent: Nov. 5, 2002

(54) AIR-ROUTING SYSTEM, ESPECIALLY A SUCTION SYSTEM OF AN INTERNAL COMBUSTION ENGINE

(75) Inventors: Christof Baumann, Moeglingen; Werner Blossey, Benningen; Hans-Peter Hielscher, Steinheim; Thomas Jessberger, Rutesheim; Herbert Pietrowski, Pleidelsheim; Achim Rehmann, Kieselbronn; Hans-Peter Scholl, Mundelsheim, all of (DE)

(73) Assignee: Filterwerk Mann & Hummel GmbH, Ludwigshafen (DE)

( * ) Notice: Subject to any disclaimer, the term of this patent is extended or adjusted under 35 U.S.C. 154(b) by 0 days.

(21) Appl. No.: 09/807,072
(22) PCT Filed: Sep. 17, 1999
(86) PCT No.: PCT/EP99/06894
§ 371 (c)(1), (2), (4) Date: Jul. 10, 2001
(87) PCT Pub. No.: WO00/22293
PCT Pub. Date: Apr. 20, 2000

(30) Foreign Application Priority Data

Oct. 8, 1998 (DE) .......................................... 198 46 281

(51) Int. Cl.$^7$ ............................................. F02M 35/104
(52) U.S. Cl. ........................... 123/184.47; 123/184.24; 123/184.34; 123/184.42
(58) Field of Search ........................ 123/184.47, 184.48, 123/184.49, 184.42, 184.43, 184.44, 184.34, 184.35, 184.36, 184.24, 184.25, 184.26

(56) References Cited

U.S. PATENT DOCUMENTS

| 4,765,285 A | * | 8/1988 | Kobayashi | 123/184.49 |
|---|---|---|---|---|
| 5,657,727 A | * | 8/1997 | Uchida | 123/184.47 |
| 5,950,586 A | * | 9/1999 | Ropertz | 123/184.42 |
| 6,024,066 A | * | 2/2000 | Nakayama | 123/184.47 |
| 6,089,202 A | * | 7/2000 | Nomura et al. | 123/184.42 |
| 6,098,586 A | * | 8/2000 | Bloomer | 123/184.47 |
| 6,192,849 B1 | * | 2/2001 | Powell | 123/184.34 |

* cited by examiner

Primary Examiner—Paul J. Hirsch
(74) Attorney, Agent, or Firm—Crowell & Moring LLP

(57) ABSTRACT

An air routing system, especially an air intake system of an internal combustion engine, which makes optimal use of available installation space by integrating a bypass channel (25) into an air intake module (10). The volume of the bypass channel also provides an acoustic shield for the collector chamber or plenum (22). The free area (13) behind the mounting flange (11) that is required for screwing in mounting bolts in order to mount the air intake module (10) is used by an air intake hood (14) which can be installed on the filter housing (15) after the air intake module has been mounted. This assures that there is a greater volume available in the filter housing (15), thereby reducing the noise at the inlet opening of the air intake module.

6 Claims, 2 Drawing Sheets

AIR-ROUTING SYSTEM, ESPECIALLY A SUCTION SYSTEM OF AN INTERNAL COMBUSTION ENGINE

STATE OF THE ART

Figure 1:
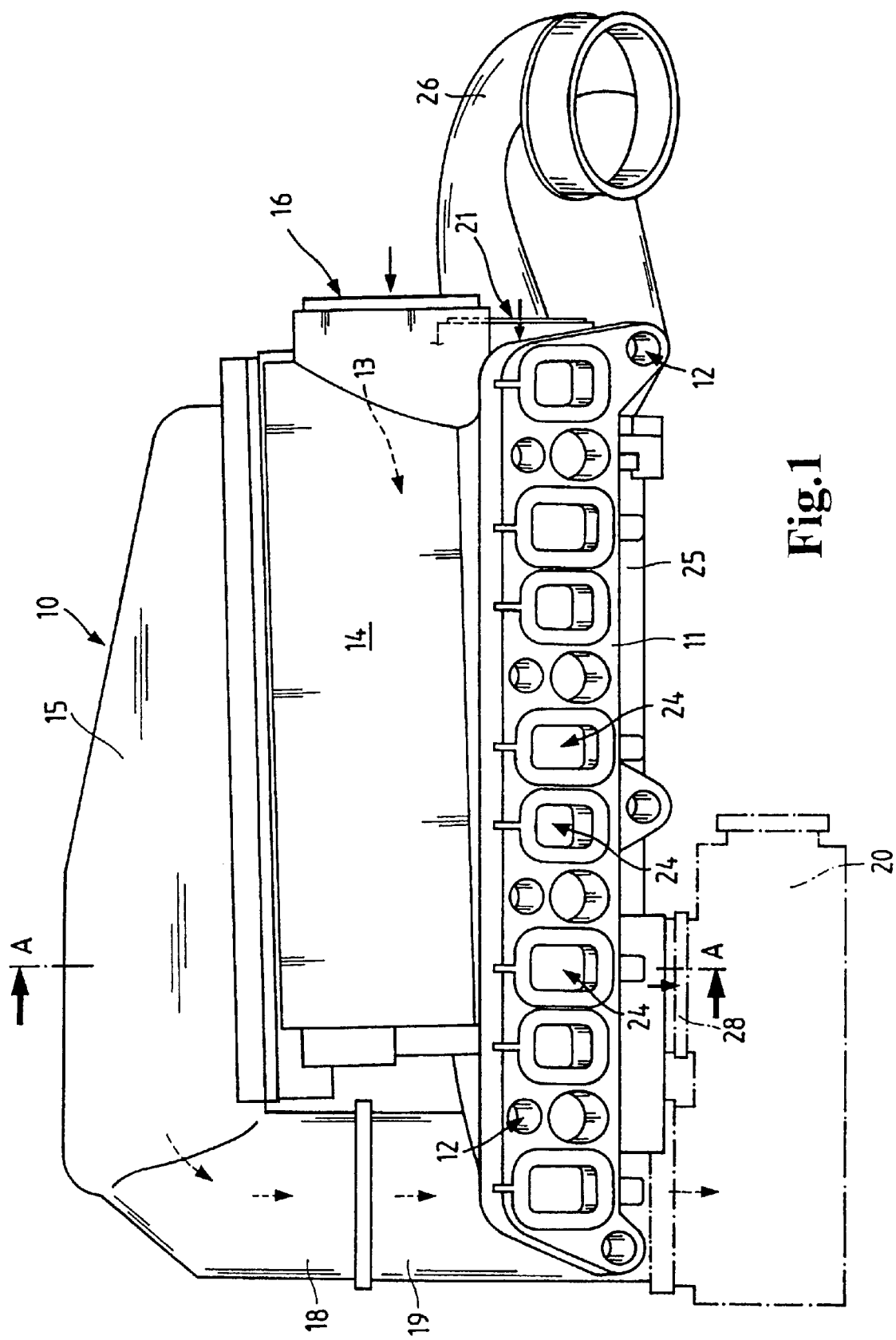

The invention relates to an air routing system, particularly an intake system of an internal combustion engine. The invention further relates to an intake module, particularly an intake module of an internal combustion engine.

Air routing systems for use as an intake tract for internal combustion engines are known, for example, from EP 0664390. This document notably describes the integration of the air filter housing and the intake pipe in a single cast part. Further components, such as an air/oil separator for the crankcase gases, may also be integrated into the intake module thus created. These measures are also particularly suitable for the design of plastic intake pipes produced by means of multishell technology.

The increasing requirements for engine output and driving comfort, however, result in increasingly tighter space conditions in the engine compartment, e.g., due to the increasing number of engine components. Consequently, the air intake system for the engine must also have a more compact design. On the other hand, certain minimum volumes are required to produce the necessary acoustic properties of the intake system.

Known technical solutions suggest approaches to component integration in view of the reduced overall space. But these can be further improved.

The object of the invention is to provide an air intake system, particularly for internal combustion engines, which optimally uses the available space and thereby creates additional volumes that can serve to enhance the behavior of the intake system with respect to its flow characteristics and its acoustics. This object is attained by the present invention as described hereinafter.

ADVANTAGES OF THE INVENTION

The air routing system according to the invention is provided particularly for engines that are charged by compressors and have an air bypass to compensate the compressor overpressure in the high-speed range of the engine. This bypass line supplies the excess combustion air back to the filtered a air pipe behind the air filter in front of the compressor. According to the invention, said bypass line is integrated into the lower shell of the intake module. In contrast to a hose assembly with round cross section, which might alternatively be considered, this solution does not create a dead space. Thus, the available clearance is optimally utilized. Furthermore, this measure clearly reduces the complexity of the final assembly of the vehicle since replacing the hose with the integrated channel eliminates a component that is difficult to handle. An additional advantage is a reduction of the total weight of the intake system.

A special embodiment of the bypass line provides that it be arranged around the intake air plenum. This achieves not only a component integration but also a functional integration. The volume of the bypass line in this embodiment additionally acts as sound insulation.

A further modification of the bypass line provides that the connection of the bypass line to the compressor be made of an elastic molded part.

This part can be optimally adapted to the available clearance and thus facilitates assembly.

A further embodiment of the invention provides for a resonant cavity in the intermediate line between filter and compressor into which the bypass line simultaneously opens. This, too, is a functional integration measure. The air supply line may simultaneously be used to optimize the intake housing acoustically.

Another approach according to the invention for optimizing the space of the air intake system provides for a hood on the air filter housing, which together with the intake pipe forms the core part of the intake module. This hood should be capable of being mounted quickly, which is advantageously ensured by a snap on connection. The mounted hood uses a clearance that must be provided for the assembly tools of the intake pipe or other components in the engine compartment. Assembly of the intake pipe or the other engine components is thus affected with the hood removed, which can subsequently be mounted again.

According to one embodiment of the inventive concept of the filter housing with hood, the air volume available within the filter housing is enlarged. This has a positive effect on the noise at the mouth of the intake pipe, since the additional volume acts as a damper. Furthermore, the distribution of the air over the filter element is improved. This increases the filter's service life.

According to a further embodiment of the invention the unfiltered-air-side inlet of the filter housing is provided within the hood. This measure makes it possible to combine the hood with the air intake of the intake system into a preassembled unit. In this way it is possible to further optimize the assembly of the engine.

These and other features of preferred further embodiments of the invention are set forth in the claims as well as in the description and the drawings. The individual features may be implemented either alone or in combination in the embodiment of the invention or in other fields of application and may represent advantageous embodiments that are protectable per se, for which protection is hereby claimed.

DRAWING

Figure 2:
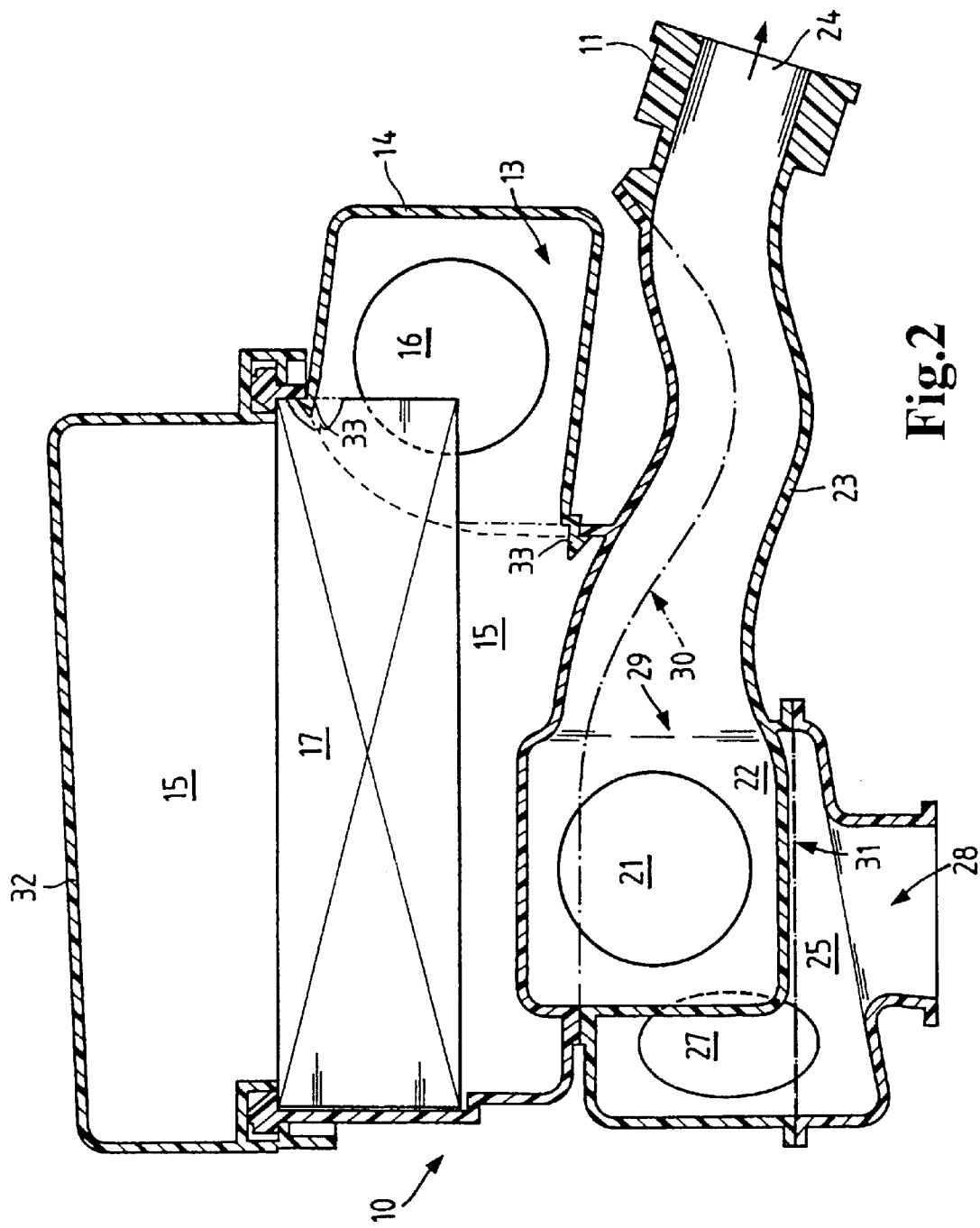

An embodiment of the invention will now be described, by way of example, with reference to the drawings in which:

FIG. 1 shows a side elevation of the intake module as seen from the direction of the cylinder head, and FIG. 2 shows the section along line A—A according to FIG. 1 through the intake module along one of the intake pipes.

DESCRIPTION OF THE EMBODIMENTS

FIG. 1 is a side view of an air intake module 10. To mount the intake module, a mounting flange 11 is provided having bores as seats 12 for mounting the intake module by means of bolts to a cylinder head (not depicted). To mount the intake module, it is therefore necessary to provide a clearance 13 obliquely above the mounting flange 11 so that the fastening bolts are accessible with mounting tools. After assembly, however, this clearance is no longer required. During operation of the vehicle, it is an unused volume in the engine compartment. This is why a hood 14 is provided on the intake module 10, which enlarges the air intake volume of an air filter housing 15 in that it uses this clearance 13. Prior to mounting the hood, the clearance is available, however, for the assembly tools. After assembly of the intake module, the hood may simply be replaced.

The path of the intake air through the intake module is shown in FIGS. 1 and 2. The intake air reaches the system through an unfiltered air inlet 16. This air inlet is integrated into hood 14. The air is sucked through a filter element 17 and leaves the air filter housing 15 through a filtered air outlet 18 which ends in an intermediate line 19. The intermediate line opens into a resonance volume 20, which is the connecting element to a compressor (not shown).

The compressed intake air coming from the compressor passes through a filtered air inlet 21 to reach the intake module. The filtered air inlet opens into a plenum 22 from which the individual suction pipes 23 branch off. The suction pipes end in suction pipe outlets 24 in the mounting flange 11, through which the intake air leaves the intake module and reaches the cylinders.

In higher speed ranges, the charging pressure generated by the compressor is too high for the intake air. This pressure is reduced in that the excess compressed air is returned via a bypass line 25 to the filtered air in front of the compressor. The bypass air is supplied to the intake module via a molded part 26 through a return air inlet 27. The air flows through the bypass line 25 and leaves it through an inlet 28, which leads to the resonance volume 20. Here, the air is mixed with filtered air from the intermediate line 19 and then passes again through the compressor.

Toward the top, the plenum 22 adjoins the volume of the filter housing. Toward the bottom and the side facing away from the intake pipe inlets 29, the plenum 22 is surrounded by the volume of the bypass channel 25. The integration of the bypass line into the intake module thus results in a nearly complete encapsulation of the intake air plenum. This has positive effects on the acoustic characteristics of the intake module. The intake module is preferably made of plastic. The basic body may be produced by means of multishell technology. A parting line 30 extends through the plenum as well as through the intake pipes of the intake module. An additional parting line 31 is required in the bypass line. The intake pipe shells are joined, for instance, by vibration welding. The filter housing 15 furthermore has a cover 32, which can be removed to install the filter element. The hood 14 may be mounted to the intake module, for instance, by snap on connections 33.

What is claimed is:

1. An air intake module for an internal combustion engine comprising a series of air conduction channels and volumes for conducting the air from a raw air inlet to intake pipe outlets in a mounting flange having seats for attachment to a cylinder head of the internal combustion engine, wherein the air conduction channels are formed by walls of the intake module, and a portion of the channel forming walls is formed by at least one hood, and said hood projects into a clearance provided for assembly tools.

2. An intake module according to claim 1, wherein said module comprises a filter housing with an raw air inlet and a clean air outlet in which an air filter is located, a plenum with a clean air inlet and a plurality of connected intake pipes, a mounting flange mounted to the intake pipe outlets and having seats for attachment to the cylinder head, and wherein at least a portion of the filter housing is formed by said hood, and said clearance, into which the hood projects, adjoins the mounting flange.

3. An intake module according to claim 1, wherein the hood is affixed to the filter housing by a snap on connection.

4. An intake module according to claims 1, wherein the raw air inlet is integrated into the hood.

5. An intake module according to claims 2, wherein the clearance is a space for assembly tools of the intake pipes.

6. An intake module according to claims 1, wherein the clearance is a space for assembly tools of intake pipes.

* * * * *